Oct. 29, 1929.  W. H. WILLIAMSON  1,733,926

TROLLEY HEAD

Filed June 16, 1928

Inventor

WILLIAM H. WILLIAMSON

Attorney

Patented Oct. 29, 1929

1,733,926

UNITED STATES PATENT OFFICE

WILLIAM H. WILLIAMSON, OF HAMILTON, ONTARIO, CANADA

TROLLEY HEAD

Application filed June 16, 1928. Serial No. 285,834.

This invention relates to trolley heads such as are used on the trolleys of street cars and the like.

The principal object of the invention is to provide a self-lubricating trolley wheel which is so constructed and arranged that prior to the parts being assembled they are filled with a suitable graphite or other heavy lubricant packing, the arrangement of parts being carried out with a view of preventing the washing out by rain or the like of such lubricant so that after being put into service the wheel remains lubricated for a long time.

A second important object of the invention is to provide an improved head of this description which can be readily disassembled for the renewal of lubricant or the replacement of worn parts.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, said:

Figure 1:
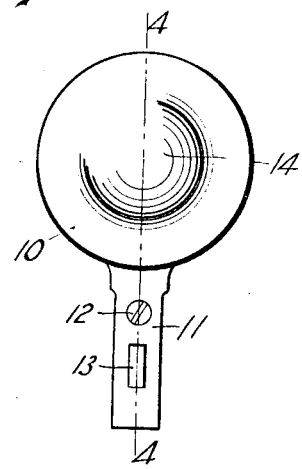
Figure 1 is a side view of a trolley head constructed in accordance with this invention.
Figure 2:
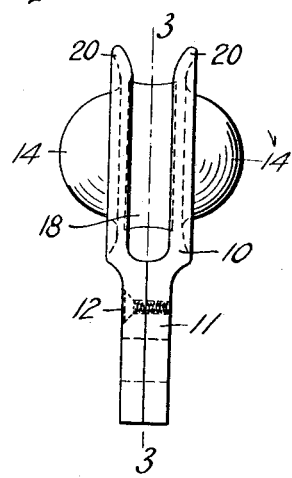
Figure 2 is a front view thereof.
Figure 3:
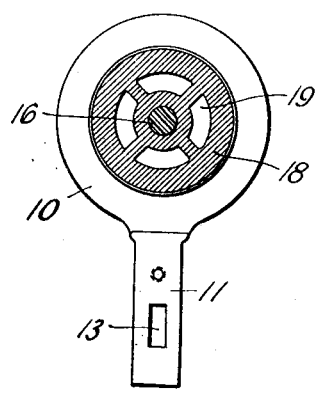
Figure 3 is a section on the line 3—3 of Figure 2.
Figure 4:
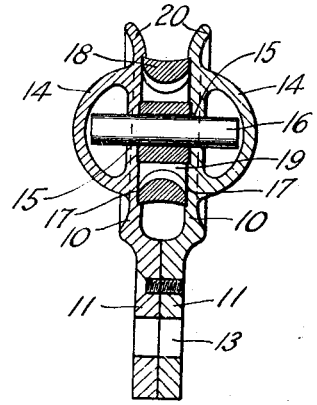
Figure 4 is a section on the line 4—4 of Figure 1.

In carrying out this invention there is provided a pair of similar side members which, when assembled, form the trolley harp. Each of these members consists of a circular body portion 10 from which extends a half round shank 11, the flat faces of these shanks contacting, when the parts are assembled, and the shanks and harp head portions being held together by a screw 12. This shank fits into the trolley pole in the usual manner and the halves of the shank are provided with registering openings 13 for the key which is used to hold the head on the hollow trolley pole. On the outside of each portion 10 is a hollow semi-circular boss 14 which covers a bearing hole 15, these two holes being alined to receive the shaft 16. The confronting faces of the members 10 are recessed as at 17 so that the trolley wheel 18 seats in these recessed faces on the shaft 16. This trolley wheel has the usual concave periphery and is provided with a series of lubricant receiving pockets 19. The members 10 at their upper ends are flared apart as indicated at 20 to receive the trolley wire.

Before assembling the hollow bosses and the pockets 19 are packed with lubricant after which the parts are assembled. It will be seen that the recess prevents the lubricant from being washed out and that the wheel, by fitting closely in such recess, also aids in this. It will further be seen that the lubricant is disposed at such points that all moving parts are thoroughly lubricated.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

A trolley head consisting of a pair of cooperating harp sides having alined shaft bearing holes, hollow bosses each covering a respective shaft hole, a shaft passing through said bearing holes and into said bosses, and a trolley wheel mounted on said shaft, the confronting faces of said harp sides being recessed to receive the trolley wheel, said wheel having its side portions fitting closely in said recesses and being provided with lubricant receiving pockets.

In testimony whereof I affix my signature.

WILLIAM H. WILLIAMSON.